United States Patent

[11] 3,536,221

| | | |
|---|---|---|
| [72] | Inventor | Cecil Goodacre<br>Basingstoke, England |
| [21] | Appl. No. | 799,330 |
| [22] | Filed | Feb. 14, 1969 |
| [45] | Patented | Oct. 27, 1970 |
| [73] | Assignee | Lansing Bagnall Limited<br>Basingstoke, England<br>a British Company |
| [32] | Priority | Feb. 16, 1968 |
| [33] | | Great Britain |
| [31] | | 7,737/68 |

[54] INDUSTRIAL LIFT TRUCKS
6 Claims, 3 Drawing Figs.

[52] U.S. Cl. .................................................. 214/670
[51] Int. Cl. .................................................. B66f 9/10
[50] Field of Search ....................................... 214/670,
660, 671, 672, 75, 75(H)

[56] References Cited
UNITED STATES PATENTS
3,231,109  1/1966  Bengel et al. ............. 214/670X

*Primary Examiner*—Gerald M. Forlenza
*Assistant Examiner*—Robert J. Spar
*Attorney*—E. T. Le Gates

ABSTRACT: An industrial lift truck of the kind having a reach carriage movable longitudinally of the truck, in which the means for moving the reach carriage comprises a hydraulic jack connected between the body of the truck and a linkage which linkage is connected between the reach carriage and the body of the truck and comprises a link having one end connected to the reach carriage and the other end connected to the front end of a lever, the rear end of which is mounted on the body of the truck for pivotal movement of the lever in a vertical plane, so that operation of the jack extends the linkage to move the reach carriage longitudinally of the truck.

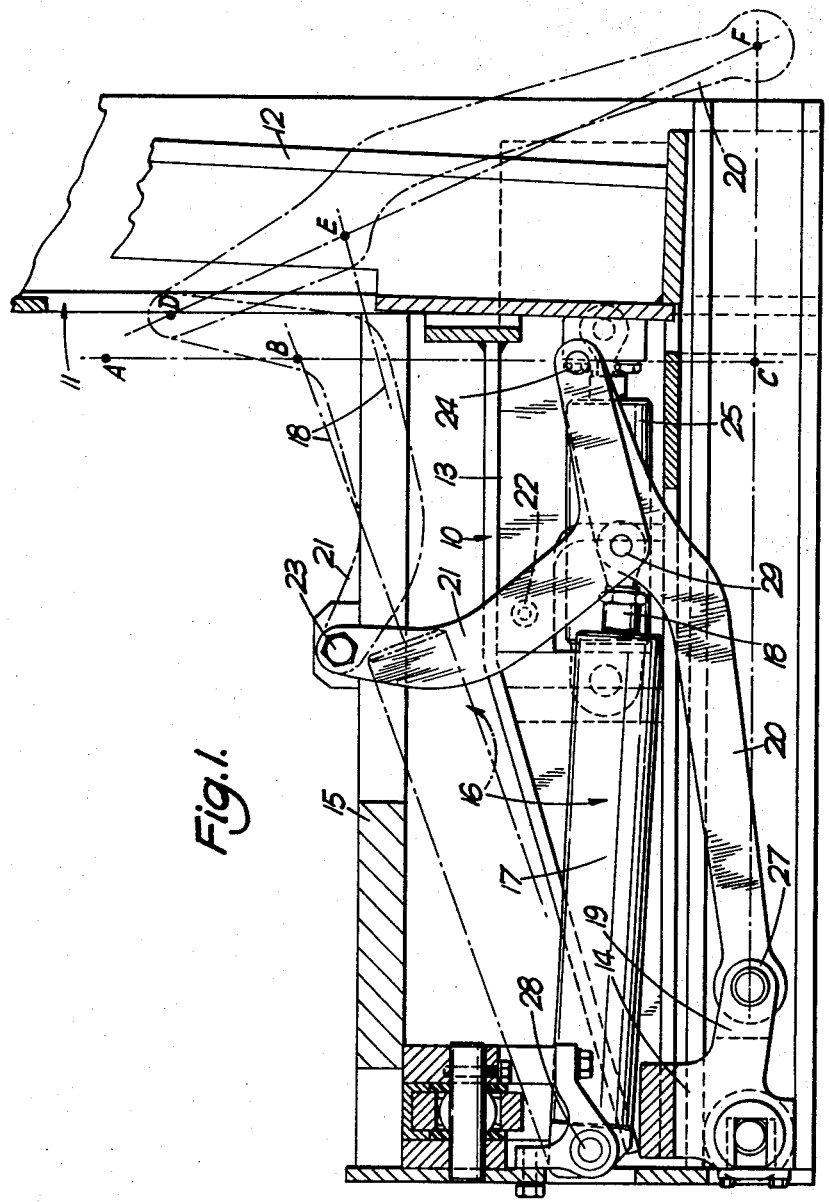

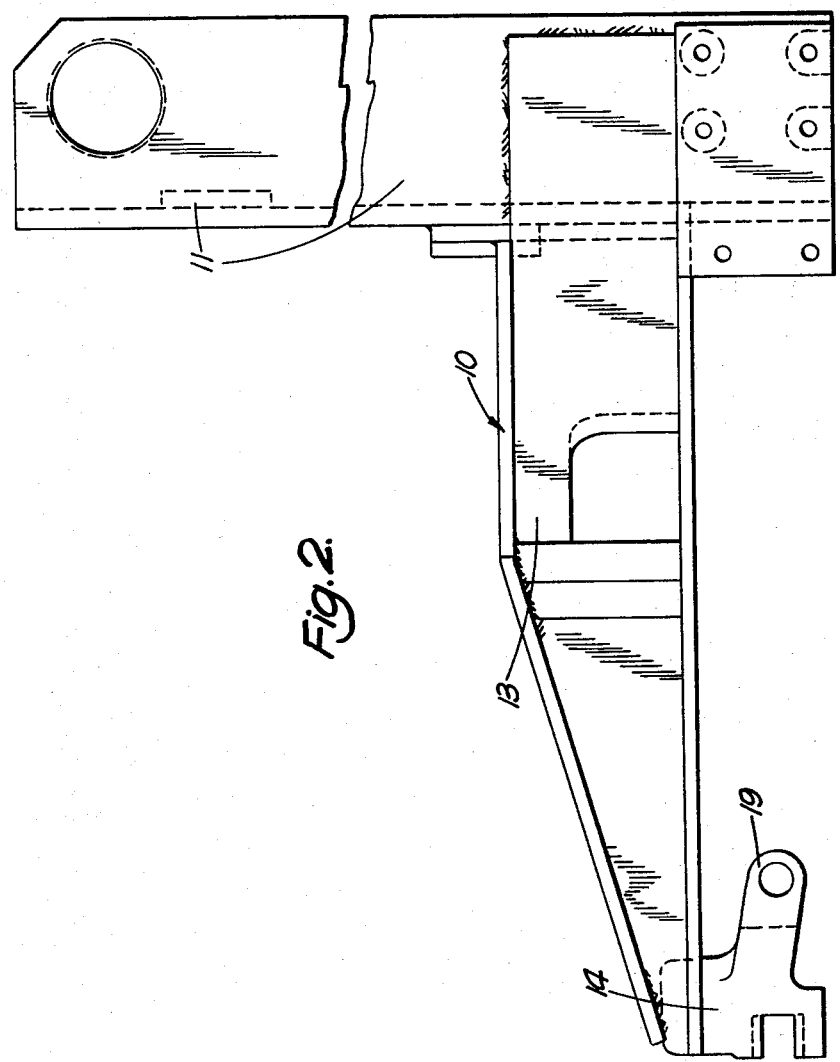

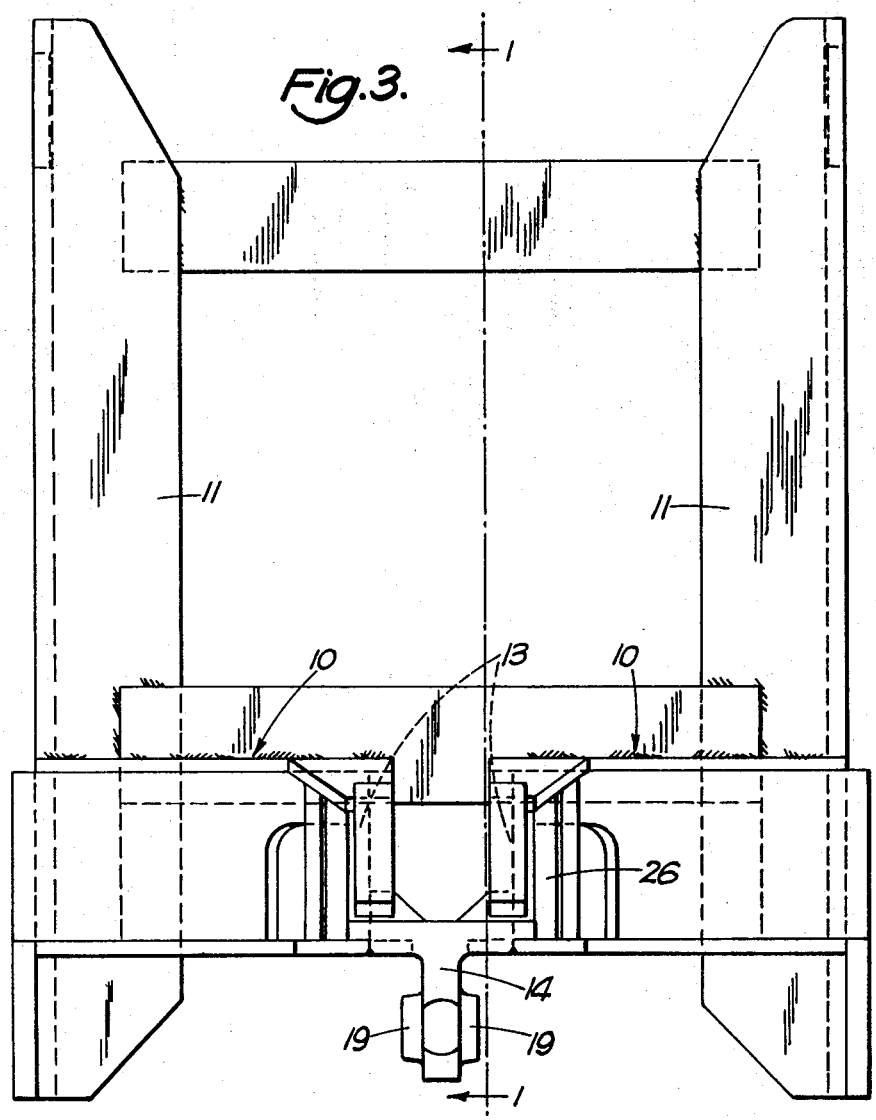

INDUSTRIAL LIFT TRUCKS

This invention relates to industrial lift trucks and more particularly to trucks of the kind having a body portion, a mast carrying a load-lifting carriage mounted in front of the body portion on a reach carriage guided for movement along a path extending longitudinally of the truck, and means for extending and retracting the reach carriage, and thus the mast and load-lifting carriage, along said path.

According to the invention an industrial truck of the above kind is provided with means for extending and retracting the reach carriage which means comprise a hydraulic jack having one end pivotally connected to a mounting point on the body portion of the truck and the other end pivotally connected to a linkage which is connected between the reach carriage and the body portion of the truck so that on extension and retraction of the jack the linkage extends and retracts the reach carriage along said path, the said linkage comprising a link which, when the reach carriage is in the retracted position, extends from a point in front of the jack rearwardly towards the said mounting point for the jack, the rear end of said link being pivotally connected to the reach carriage and the front end of said link being pivotally connected to the front end of a lever, the rear end of the lever being pivotally mounted to the body portion of the truck so that the point of connection between the link and the lever is movable, in a vertical plane, on a circular arc centred at the pivotal mounting of the lever on the body portion of the truck, the said pivotal mounting of the lever being above and behind the said point of connection between the link and the lever when the reach carriage is in its retracted position.

In one form of the invention the said other end of the jack, which may be the free end of the piston thereof, is pivotally connected to the link at a point intermediate the ends of the link.

Preferably, when the reach carriage is in the retracted position, the whole of the jack and the linkage are located within that portion of the length of the truck which is occupied by the body portion of the truck.

Also, in the case of the body portion of the truck being provided with an operator platform, it is preferred that, when the reach carriage is in the retracted position, the whole of the jack and at least the greater part of the linkage are located below the level of the operator platform.

By way of example, a specific embodiment in accordance with the invention will now be described with reference to the accompanying drawings in which:

FIG. 1 is a sectional elevation of the reach carriage of an industrial lift truck, taken on the line I–I in FIG. 3, and of the linkage provided for effecting extension and retraction of the reach carriage;

FIG. 2 is an elevation of the reach carriage shown in FIG. 1; and

FIG. 3 is a rear view of the reach carriage shown in FIG. 1.

The subject of this example is an industrial lift truck of the kind described in British patent specification No. 839,000. The truck described in this prior specification includes a body portion having forwardly projecting straddle legs and a mast structure mounted in front of the body portion on a reach carriage, the mast having a load-lifting carriage capable of up and down movement on the mast. The reach carriage is provided with forward guide rollers which are widely spaced for sliding movement within inwardly facing channels constituted by the straddle legs and rearward guide rollers which are closely spaced for sliding movement within further inwardly facing channels mounted substantially centrally of the truck and below the body portion. The said rearward guide rollers are mounted on a rocker axle to allow for any relative vertical movement that may occur between the channels due to the truck moving over or standing on uneven floors.

Extension and retraction of the reach carriage, in this prior construction of truck, is effected by a hydraulic jack which is connected at its rear end to the body portion of the truck and at its front end to the reach carriage.

This invention concerns only means for effecting extension and retraction of the reach carriage and thus the general construction of the truck need not further be described.

With reference to the drawings, the reach carriage 10 comprises a pair of upstanding posts 11 on which the mast 12 is pivotally mounted, and a rearwardly extending and generally horizontal frame 13 which, at its rear end, is provided with a bracket 14. This bracket 14 carries the rocker axle for the rearward guide rollers for the reach carriage, and, in the rear position of the reach carriage, is located at the extreme back end of the truck beneath an operator support platform 15.

Also, located beneath the platform 15, is a hydraulic jack 16 for effecting extension and retraction of the reach carriage. In this example, the rear end of the cylinder 17 of this jack is pivotally mounted at 28 to the body portion of the truck, above the position occupied by the bracket 14 when the reach carriage is in the rear position, and the free end of the piston 18 of the jack is indirectly connected to a forked forwardly projecting lug 19 on the bracket 14 of the reach carriage by a link 20, the link being pivotally connected at 27 to the lug 19, and the free end of the piston of the jack being pivotally connected at 29 to the link, the point of connection 29 being intermediate the ends of the link. The forward end of the link 20 is pivotally connected at 24 to the forward ends of a pair of crescent-shaped levers 21, the rear ends of these levers being pivotally connected to points, on the same horizontal axis 23, on the body portion of the truck. These levers 21 are joined together by a transverse pin 22 and move in unison with each other.

The reach carriage 10 is shown in FIG. 1 in its fully retracted position. In this position of the reach carriage, the jack 16 and the whole of the linkage connecting the jack to the reach carriage, i.e. the link 20 and the pair of links 21, is located behind the mast 12 and within that portion of the length of the truck which is occupied by the body portion. Moreover, the jack and the linkage, in all essential respects, are located below the level of the operator platform and thus do not occupy space that can be better occupied by e.g. the drive means for the truck and storage batteries therefor.

A pair of tilt-jacks 25 (of which only one is shown in FIG. 1) are provided for pivoting the mast about a horizontal axis, i.e. about the axis of the above-mentioned pivotal mounting of the mast on the upstanding posts 11 of the reach carriage. These tilt-jacks extend between the lower end of the mast and brackets 26 which connect upper and lower members of the frame 13. Extension of the tilt-jacks will effect anticlockwise pivotal movement, as viewed in FIG. 1, of the mast. When the reach carriage is retracted, the tilt-jacks 25 lie on each side of the link 20 and the levers 21.

Extension of the piston 18 of the jack 16 will effect anticlockwise pivotal movement, as viewed in FIG. 1, of the link 20 about its point of connection 24 to the levers 21 and simultaneous anticlockwise pivotal movement of the levers 21 about the fixed axis 23. The jack will thereby pivot in an anticlockwise direction about its pivotal mounting on the body portion of the truck whereby the point of connection 27 between the link 20 and the bracket 14 of the reach carriage will move along a straight line path longitudinally of the truck. The reach carriage and thus the mast will be moved forwardly of the truck by an extent which is controlled by the amount of extension of the jack. However, it will be appreciated that by virtue of the linkage, there is a mechanical advantage between the amount of extension or forward movement of the reach carriage and the amount of extension of the jack. The provision of this mechanical advantage allows the length of the jack, when retracted, to be kept to the minimum.

The positions of the free end of the piston of the jack and of the ends of the link 20, i.e. the positions of the points 29, 24, 27, upon full retraction, partial extension and full extension of the jack are shown, diagrammatically, in FIG. 1. The full retraction positions are those of the link 20 shown in full lines. The partial extension positions, shown by the dots on the line A, B, C, have been chosen for the state at which the link 20 is vertical and the levers 21 have swung through their maximum arc. This position is thus the top dead-centre position of the link. The full extension positions are shown in chain dotted lines and by the dots on the line D, E, F. It will be noticed that the levers 21 have swung downwardly from their top dead-centre position (*i.e.* from A to D) and this effects a retardation action at the end of the extending movement. This swinging action of the levers 21 and the pivotal movement of the link 20 about the free end of the piston of the jack allows the point 27 and thus the reach carriage to move in a horizontal plane. Retraction of the reach carriage and hence the mast is simply effected by retraction of the jack. Also, during the final movement of the levers 21 towards their lower, retracted, position, the pivot 27 moves proportionally at the same rate as the pivot 24 and thus the carriage moves uniformly with the piston 18. As the reach jack 16 is usually provided with a cushion valve, this uniform action ensures a smooth retardation to the retracting movement. Similarly, when the piston 18 commences its extending stroke, the reach carriage moves uniformly with it and thus gives a smooth slow start to the reach movement. It will be appreciated that a smooth slow action at each end of the reach movement reduces disturbance of a load carried by the mast through jerkiness.

The main advantages of the above-described means for extending and retracting the reach carriage are that it is simple, compact and can be situated in a part of the truck which is not required for other purposes.

I claim:

1. An industrial lift truck of the kind having a body portion, a mast carrying a load-lifting carriage mounted in front of the body portion on a reach carriage guided for movement along a path extending longitudinally of the truck and means for extending and retracting the reach carriage, and thus the mast and lift carriage, along said path in which the said means comprise a hydraulic jack having one end pivotally connected to a mounting point on the body portion of the truck and the other end pivotally connected to a linkage which is connected between the reach carriage and the body portion of the truck so that on extension and retraction of the jack the linkage extends and retracts the reach carriage along said path, the said linkage comprising a link which, when the reach carriage is in the retracted position, extends from a point in front of the jack rearwardly towards the said mounting point for the jack, the rear end of said link being pivotally connected to the reach carriage and the front end of said link being pivotally connected to the front end of a lever, the rear end of the lever being pivotally mounted to the body portion of the truck so that the point of connection between the link and the lever is movable, in a vertical plane, on a circular arc centred at the pivotal mounting of the lever on the body portion of the truck, the said pivotal mounting of the lever being above and behind the said point of connection between the link and the lever when the reach carriage is in its retracted position.

2. A truck as claimed in claim 1, in which during extension of the jack to extend the carriage the pivotal connection between the link and the lever is caused first to swing upwardly in said vertical arc and then, towards the end of the forward extension of the jack, to swing downwardly so that the rate of extending movement of the reach carriage is retarded.

3. A truck as claimed in claim 1, wherein the said other end of the jack is pivotally connected to the link at a point intermediate the ends of the link.

4. A truck as claimed in claim 1 wherein the said other end of the jack comprises the free end of the piston thereof.

5. A truck as claimed in claim 1 wherein, when the reach carriage is in the retracted position, the whole of the jack and the linkage are located within that portion of the length of the truck which is occupied by the body portion of the truck.

6. A truck as claimed in claim 1 and in which the body portion of the truck is provided with an operator platform wherein the whole of the jack and at least the greater part of the linkage are located below the level of the operator platform when the reach carriage is in the retracted position.